United States Patent
Jang et al.

(10) Patent No.: US 11,417,941 B2
(45) Date of Patent: Aug. 16, 2022

(54) BRACKET FOR ADJUSTING ANTENNA RADIATION ANGLE AND ANTENNA ASSEMBLY INCLUDING THE SAME

(71) Applicant: Samsung Electronics Co., Ltd., Suwon-si (KR)

(72) Inventors: Minsoo Jang, Suwon-si (KR); Minkyu Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 16/797,982

(22) Filed: Feb. 21, 2020

(65) Prior Publication Data

US 2020/0274223 A1    Aug. 27, 2020

(30) Foreign Application Priority Data

Feb. 21, 2019 (KR) .................. 10-2019-0020533

(51) Int. Cl.
*H01Q 1/12* (2006.01)
*H01Q 3/08* (2006.01)
*H01Q 3/06* (2006.01)

(52) U.S. Cl.
CPC ........... *H01Q 1/125* (2013.01); *H01Q 1/1264* (2013.01); *H01Q 3/06* (2013.01); *H01Q 3/08* (2013.01)

(58) Field of Classification Search
CPC ............ H01Q 1/12; H01Q 1/125; H01Q 3/06; H01Q 3/08
See application file for complete search history.

(56) References Cited

U.S. PATENT DOCUMENTS

| 5,440,318 | A  | * | 8/1995  | Butland | H01Q 21/08 343/822 |
| 6,211,845 | B1 | * | 4/2001  | Cook    | H01Q 3/08 343/882 |
| 7,954,777 | B2 | * | 6/2011  | Bohm    | F16M 13/02 403/57 |
| 9,172,137 | B2 | * | 10/2015 | Lee     | H01Q 3/06 |
| 9,246,217 | B2 | * | 1/2016  | Yang    | H01Q 1/12 |
| 9,812,767 | B2 | * | 11/2017 | Zhao    | H01Q 1/246 |

(Continued)

FOREIGN PATENT DOCUMENTS

EP    3116059 A1    1/2017
KR  20-0407800 Y1  2/2006

(Continued)

OTHER PUBLICATIONS

European Patent Office, "Supplementary European Search Report" dated Feb. 1, 2022, in connection with European Patent Application No. 20759348.4, 10 pages.

(Continued)

*Primary Examiner* — Ab Salam Alkassim, Jr.

(57) ABSTRACT

A bracket includes a first member having one end joined to a first surface of an enclosure including an antenna, a second member having one end joined to a second surface of the enclosure, and a third member including a first slot joined to another end of the first member and a second slot joined to another end of the second member. In the bracket, the another end of the first member is guided along and moved in the first slot, and the another end of the second member is guided along and moved in the second slot.

14 Claims, 5 Drawing Sheets

(56) References Cited

U.S. PATENT DOCUMENTS

| | | | |
|---|---|---|---|
| 10,309,806 B2* | 6/2019 | Angenendt | G01D 11/30 |
| 10,340,579 B2* | 7/2019 | Tsukada | H01Q 1/125 |
| 11,038,253 B1* | 6/2021 | Tseng | H01Q 1/288 |
| 2002/0084396 A1* | 7/2002 | Weaver | F16M 13/02 |
| | | | 248/278.1 |
| 2005/0264467 A1* | 12/2005 | Lin | H01Q 3/08 |
| | | | 343/882 |
| 2006/0214865 A1* | 9/2006 | Bury | H01Q 3/08 |
| | | | 343/765 |
| 2007/0132655 A1* | 6/2007 | Lin | H01Q 1/12 |
| | | | 343/882 |
| 2007/0205338 A1* | 9/2007 | Sabatino | H01Q 1/3216 |
| | | | 248/125.7 |
| 2008/0150831 A1* | 6/2008 | Tulloch | H01Q 1/1264 |
| | | | 343/882 |
| 2008/0165076 A1* | 7/2008 | Pan | H01Q 1/125 |
| | | | 343/882 |
| 2008/0291627 A1 | 11/2008 | Fischer et al. | |
| 2009/0231828 A1 | 9/2009 | Madore | |
| 2010/0079353 A1* | 4/2010 | Syed | H01Q 19/12 |
| | | | 343/882 |
| 2010/0127946 A1* | 5/2010 | Tung | H01Q 3/08 |
| | | | 343/763 |
| 2013/0002518 A1* | 1/2013 | Yang | H01Q 3/06 |
| | | | 343/882 |
| 2014/0266943 A1* | 9/2014 | Thomson | H01Q 3/08 |
| | | | 343/765 |
| 2014/0306072 A1* | 10/2014 | Yang | H01Q 3/06 |
| | | | 248/124.1 |
| 2016/0033056 A1 | 2/2016 | Bishop et al. | |
| 2017/0033446 A1* | 2/2017 | Zhao | H01Q 1/125 |
| 2018/0083356 A1* | 3/2018 | Ligander | F16M 13/02 |
| 2018/0188468 A1 | 7/2018 | Allen | |
| 2018/0212300 A1* | 7/2018 | Yang | H01Q 1/125 |
| 2021/0408661 A1* | 12/2021 | Yoo | H01Q 3/08 |

FOREIGN PATENT DOCUMENTS

| | | |
|---|---|---|
| KR | 10-2008-0093544 A | 10/2008 |
| KR | 10-1919956 B1 | 11/2018 |
| WO | 2009008601 A1 | 1/2009 |

OTHER PUBLICATIONS

International Search Report and Written Opinion of the International Searching Authority in connection with International Application No. PCT/KR2020/002318 dated May 29, 2020, 8 pages.

* cited by examiner

BRACKET FOR ADJUSTING ANTENNA RADIATION ANGLE AND ANTENNA ASSEMBLY INCLUDING THE SAME

CROSS-REFERENCE TO RELATED APPLICATION

This application is based on and claims priority under 35 U.S.C. 119 to Korean Patent Application No. 10-2019-0020533, filed on Feb. 21, 2019, in the Korean Intellectual Property Office, the disclosures of which are herein incorporated by reference in their entireties.

BACKGROUND

1. Field

The disclosure relates to a bracket capable of adjusting an antenna radiation angle and to an antenna assembly including the bracket. In particular, the disclosure provides a bracket installed on a strand wire and capable of adjusting an antenna radiation angle upwardly or downwardly.

2. Description of Related Art

To meet the demand for wireless data traffic having increased since deployment of 4G communication systems, efforts have been made to develop an improved 5th generation (5G) or pre-5G communication system. Therefore, the 5G or pre-5G communication system is also called a 'Beyond 4th generation (4G) Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

SUMMARY

Meanwhile, a wireless backhaul antenna may confront with a radio wave loss and inaccurate signal transmission depending on an antenna direction. Accordingly, there may be a need to control the antenna direction to reduce the loss of radio waves radiated from the antenna and to increase the accuracy of signal transmission. That is, a technique to adjust the direction of the antenna vertically or horizontally is required.

According to an embodiment of the disclosure, a bracket may include a first member having one end joined to a first surface of an enclosure including an antenna, a second member having one end joined to a second surface of the enclosure, and a third member including a first slot joined to other end of the first member and a second slot joined to other end of the second member. In this bracket, the other end of the first member may be guided along and moved in the first slot, and the other end of the second member may be guided along and moved in the second slot.

According to another embodiment of the disclosure, a bracket may include a first member having one end joined to a first surface of a first enclosure including a first antenna, a second member having one end joined to a second surface of the first enclosure, a third member including a first slot joined to other end of the first member and a second slot joined to other end of the second member, a fourth member having one end joined to a first surface of a second enclosure including a second antenna, a fifth member having one end joined to a second surface of the second enclosure, and a sixth member including a third slot joined to other end of the fourth member and a fourth slot joined to other end of the fifth member. In this bracket, the other end of the first member may be guided along and moved in the first slot, the other end of the second member may be guided along and moved in the second slot, the other end of the fourth member may be guided along and moved in the third slot, and the other end of the fifth member may be guided along and moved in the fourth slot.

According to still another embodiment of the disclosure, an antenna assembly may include an enclosure including an antenna disposed on a first surface thereof, a first member having one end joined to a second surface of the enclosure, a second member having one end joined to a third surface of the enclosure, and a bracket including a first slot joined to other end of the first member and a second slot joined to other end of the second member. In this antenna assembly, the other end of the first member may be guided along and moved in the first slot, and the other end of the second member may be guided along and moved in the second slot.

According to yet another embodiment of the disclosure, an antenna assembly may include a first enclosure including a first antenna disposed on a first surface thereof, a first member having one end joined to a second surface of the first enclosure, a second member having one end joined to a third surface of the first enclosure, a third member including a first slot joined to other end of the first member and a second slot joined to other end of the second member, a second enclosure including a second antenna disposed on a first surface thereof, a fourth member having one end joined to a second surface of the second enclosure, a fifth member having one end joined to a third surface of the second enclosure, and a sixth member including a third slot joined to other end of the fourth member and a fourth slot joined to other end of the fifth member. In this antenna assembly, the other end of the first member may be guided along and moved in the first slot, the other end of the second member may be guided along and moved in the second slot, the other end of the fourth member may be guided along and moved in the third slot, and the other end of the fifth member may be guided along and moved in the fourth slot.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Now, embodiments of the disclosure will be described in detail with reference to the accompanying drawings. In the following description of embodiments, descriptions of techniques that are well known in the art and not directly related to the disclosure are omitted. This is to clearly convey the subject matter of the disclosure by omitting any unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and the manner of achieving them will become apparent with reference to the embodiments described in detail below and with reference to the accompanying drawings. The disclosure may, however, be embodied in many different forms and should not be construed as being limited to the embodiments set forth herein. Rather, these embodiments are provided so that the disclosure will be thorough and complete and will fully convey the scope of the disclosure to those skilled in the art. To fully disclose the scope of the disclosure to those skilled in the art, the disclosure is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, refers to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card. In embodiments, a certain unit may include one or more processors.

Figure 1:
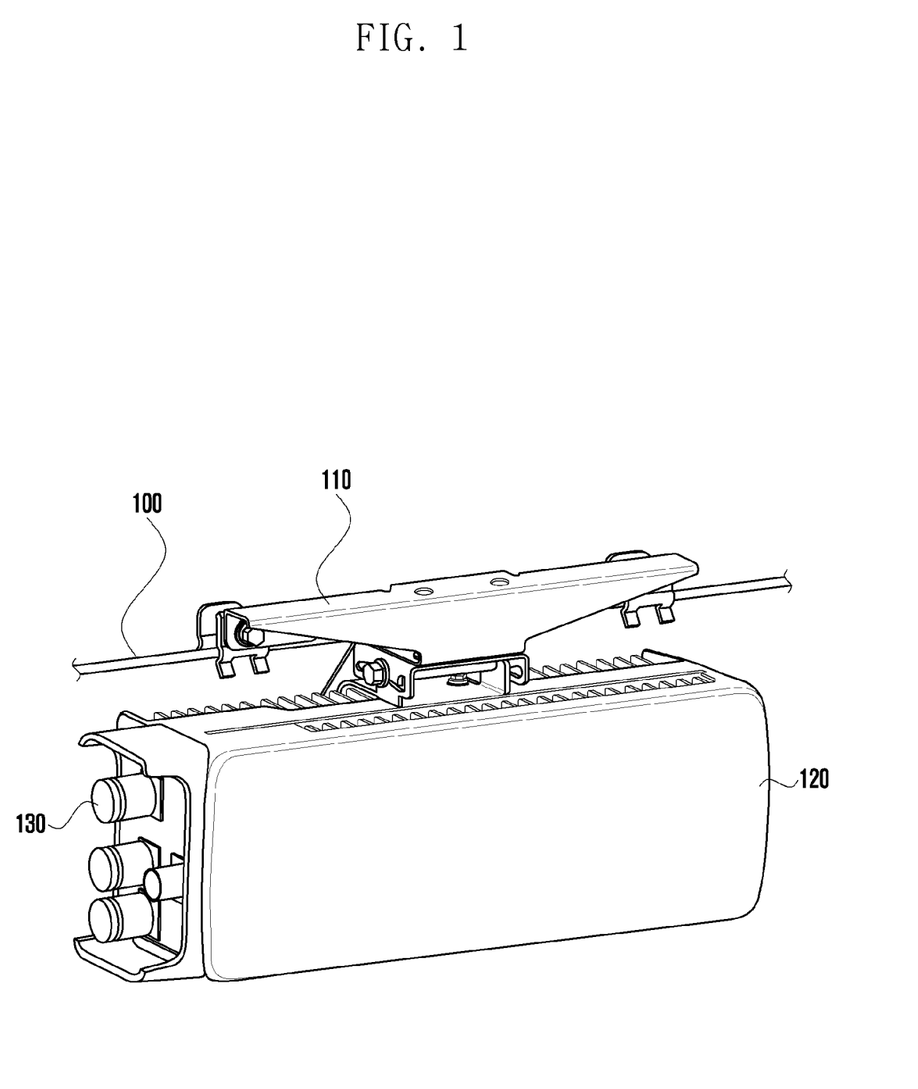
FIG. 1 illustrates a perspective view of an antenna assembly according to an embodiment of the disclosure.

FIG. 1 illustrates a perspective view of an antenna assembly according to an embodiment of the disclosure.

According to an embodiment, the antenna assembly may include an enclosure 120 and a bracket 110. According to an embodiment, at least one connector 130 may be disposed on one side of the enclosure 120, and the enclosure 120 may receive an electrical signal for communication through the at least one connector 130.

According to an embodiment, the bracket 110 may be joined to first and second surfaces of the enclosure 120 so as to fix the enclosure 120 to a wire 100. According to an embodiment, the wire 100 may be a strand wire.

According to an embodiment, the bracket 110 may be joined to the first surface of the enclosure 120 through a first joint part thereof and also joined to the second surface of the enclosure 120 through a second joint part thereof. According to an embodiment, the enclosure 120 may be rotated by being guided along both a first slot formed in the first joint part and a second slot formed in the second joint part.

According to an embodiment, the enclosure 120 may have a rectangular parallelepiped shape. The first joint part of the bracket may be joined to the first surface of the enclosure 120, and the second joint part of the bracket may be joined to the second surface of the enclosure 120. An antenna may be disposed on a third surface of the enclosure 120. According to an embodiment, the enclosure 120 and the antenna may be integrated with each other. According to an embodiment, rotating the enclosure 120 through the first and second joint parts may adjust a radio wave radiation angle of the antenna integrally formed with the enclosure 120.

A rotatable structure of the antenna assembly including the enclosure combined with the antenna will be described below with reference to FIGS. 2A and 2B. Meanwhile, the antenna assembly shown in FIG. 1 is exemplary only, and the scope of the disclosure is not be limited thereto.

Figure 2A:
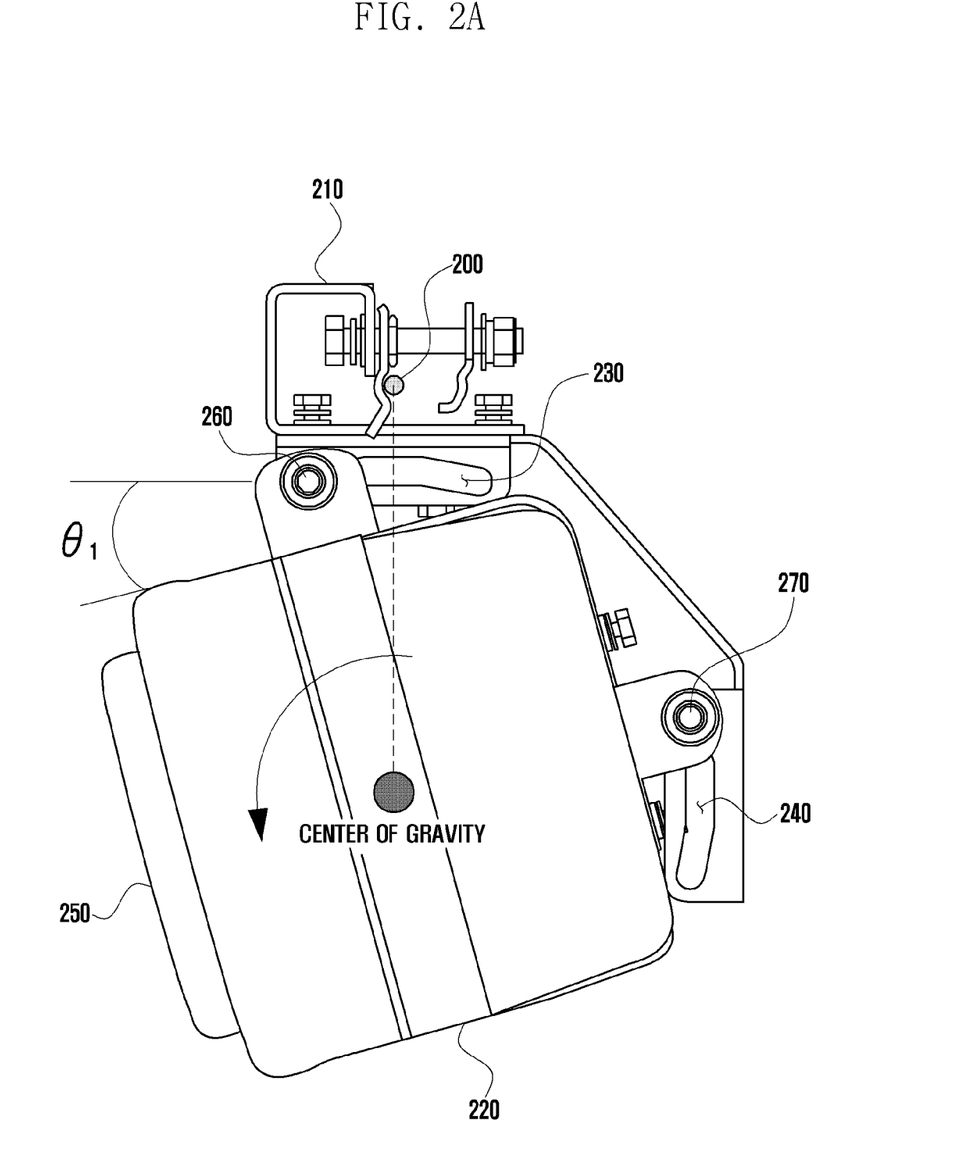
FIG. 2A illustrates a view of an enclosure of an antenna assembly tilted in a first direction according to an embodiment of the disclosure.

FIG. 2A illustrates a view of an enclosure of an antenna assembly tilted in a first direction according to an embodiment of the disclosure.

According to an embodiment, the antenna assembly may include an enclosure 220, a bracket 210, and an antenna 250. According to an embodiment, the antenna 250 may be combined with a first surface of the enclosure 220 to be formed integrally with the enclosure 220.

According to an embodiment, the bracket 210 may include a first joint part for being joined to a second surface of the enclosure 220 and a second joint part for being joined to a third surface of the enclosure 220. According to an embodiment, the first joint part may include a first slot 230 and a first protrusion 260 connected with the first slot 230. According to an embodiment, the first protrusion 260 may be joined to the second surface of the enclosure 220. For example, the first protrusion 260 and the enclosure 220 may be combined with each other through a bolting method.

According to an embodiment, the first protrusion 260 may include a first bolt and a first nut. According to an embodiment, the enclosure 220 combined with the first protrusion 260 may be fixedly joined to the bracket 210 by inserting the first bolt into the first slot 230 and then engaging the first nut with the first bolt.

According to an embodiment, the second joint part may include a second slot 240 and a second protrusion 270 connected with the second slot 240. According to an embodiment, the second protrusion 270 may be joined to the third surface of the enclosure 220. For example, the second protrusion 270 and the enclosure 220 may be combined with each other through a bolting method.

According to an embodiment, the second protrusion 270 may include a second bolt and a second nut. According to an embodiment, the enclosure 220 combined with the second protrusion 270 may be fixedly joined to the bracket 210 by inserting the second bolt into the second slot 240 and then engaging the second nut with the second bolt.

According to an embodiment, the first protrusion 260 may be guided along and moved in the first slot 230, and the second protrusion 270 may be guided along and moved in the second slot 240. According to an embodiment, each of the first slot 230 and the second slot 240 may have a curved shape or an arc shape.

According to an embodiment, when the first protrusion 260 is fixed to the center of the first slot 230 and the second protrusion 270 is fixed to the center of the second slot 240, the antenna 250 disposed on the first surface of the enclosure 220 may radiate a radio wave in a first direction. In case of the antenna assembly structure shown in FIG. 2A, when the first protrusion 260 is fixed to the center of the first slot 230 and the second protrusion 270 is fixed to the center of the second slot 240, the antenna 250 may radiate a radio wave about a 180-degree direction on the assumption that the center of gravity of the enclosure 220 is the origin.

According to an embodiment, when the first protrusion 260 is fixed to one end of the first slot 230 and the second protrusion 270 is fixed to one end of the second slot 240, the antenna 250 disposed on the first surface of the enclosure 220 may radiate a radio wave in a second direction.

According to an embodiment, when the first protrusion 260 is moved from the center of the first slot 230 to one end of the first slot 230 and also the second protrusion 270 is moved from the center of the second slot 240 to one end of the second slot 240 as shown in FIG. 2A, the enclosure 220 may rotate by a specific angle (θ1) in the counterclockwise direction. In this case, the radiation angle of the antenna 250 integrally combined with the first surface of the enclosure 220 may also rotate by the specific angle (θ1) in the counterclockwise direction.

According to an embodiment, one end portion of the bracket 210 may be fixed to the wire 200. According to an embodiment, the wire 200 may include a strand wire. According to an embodiment, when a virtual three-dimensional space is formed using, as the origin, the center of gravity of the enclosure 220 integrally combined with the antenna 250, the center of the wire 200 may be positioned on the y-axis of the three-dimensional space. In this case, even if the enclosure 220 rotates by a certain angle, the antenna assembly may not be inclined in a specific direction.

Figure 2B:
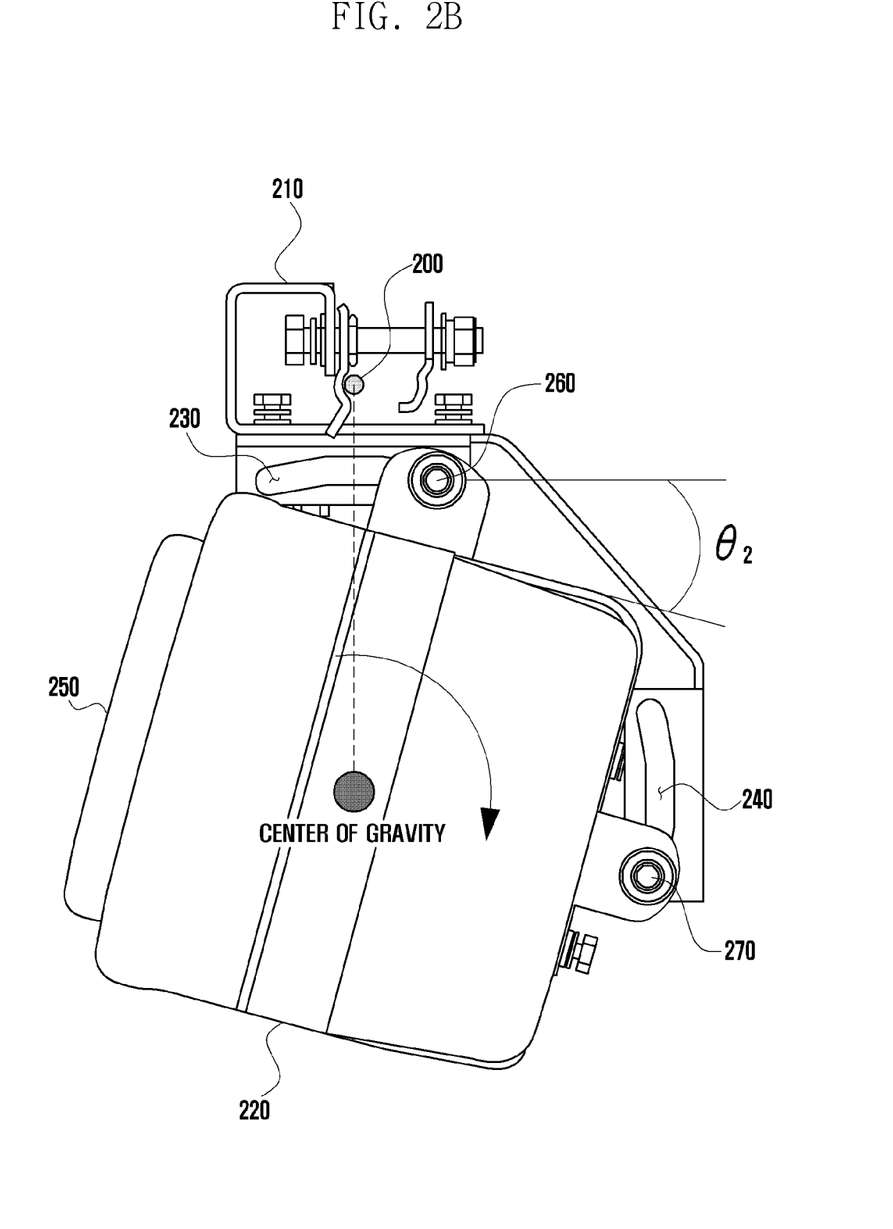
FIG. 2B illustrates a view of an enclosure of an antenna assembly tilted in a second direction according to an embodiment of the disclosure.

FIG. 2B illustrates a view of an enclosure of an antenna assembly tilted in a second direction according to an embodiment of the disclosure.

According to an embodiment, the antenna assembly may include an enclosure 220, a bracket 210, and an antenna 250. According to an embodiment, the antenna 250 may be combined with a first surface of the enclosure 220 to be formed integrally with the enclosure 220.

According to an embodiment, the bracket 210 may include a first joint part for being joined to a second surface of the enclosure 220 and a second joint part for being joined to a third surface of the enclosure 220. According to an embodiment, the first joint part may include a first slot 230 and a first protrusion 260 connected with the first slot 230. According to an embodiment, the first protrusion 260 may be joined to the second surface of the enclosure 220. For example, the first protrusion 260 and the enclosure 220 may be combined with each other through a bolting method.

According to an embodiment, the first protrusion 260 may include a first bolt and a first nut. According to an embodiment, the enclosure 220 combined with the first protrusion 260 may be fixedly joined to the bracket 210 by inserting the first bolt into the first slot 230 and then engaging the first nut with the first bolt.

According to an embodiment, the second joint part may include a second slot 240 and a second protrusion 270 connected with the second slot 240. According to an embodiment, the second protrusion 270 may be joined to the third surface of the enclosure 220. For example, the second protrusion 270 and the enclosure 220 may be combined with each other through a bolting method.

According to an embodiment, the second protrusion 270 may include a second bolt and a second nut. According to an embodiment, the enclosure 220 combined with the second protrusion 270 may be fixedly joined to the bracket 210 by inserting the second bolt into the second slot 240 and then engaging the second nut with the second bolt.

According to an embodiment, the first protrusion 260 may be guided along and moved in the first slot 230, and the second protrusion 270 may be guided along and moved in the second slot 240. According to an embodiment, each of the first slot 230 and the second slot 240 may have a curved shape or an arc shape.

According to an embodiment, when the first protrusion 260 is fixed to the center of the first slot 230 and the second protrusion 270 is fixed to the center of the second slot 240, the antenna 250 disposed on the first surface of the enclosure 220 may radiate a radio wave in a first direction. In case of the antenna assembly structure shown in FIG. 2B, when the first protrusion 260 is fixed to the center of the first slot 230 and the second protrusion 270 is fixed to the center of the second slot 240, the antenna 250 may radiate a radio wave about a 180-degree direction on the assumption that the center of gravity of the enclosure 220 is the origin.

According to an embodiment, when the first protrusion 260 is fixed to the other end of the first slot 230 and the second protrusion 270 is fixed to the other end of the second slot 240, the antenna 250 disposed on the first surface of the enclosure 220 may radiate a radio wave in a second direction.

According to an embodiment, when the first protrusion 260 is moved from the center of the first slot 230 to the other end of the first slot 230 and also the second protrusion 270 is moved from the center of the second slot 240 to the other end of the second slot 240 as shown in FIG. 2B, the enclosure 220 may rotate by a specific angle (θ2) in the clockwise direction. In this case, the radiation angle of the antenna 250 integrally combined with the first surface of the enclosure 220 may also rotate by the specific angle (θ2) in the clockwise direction.

Figure 3:
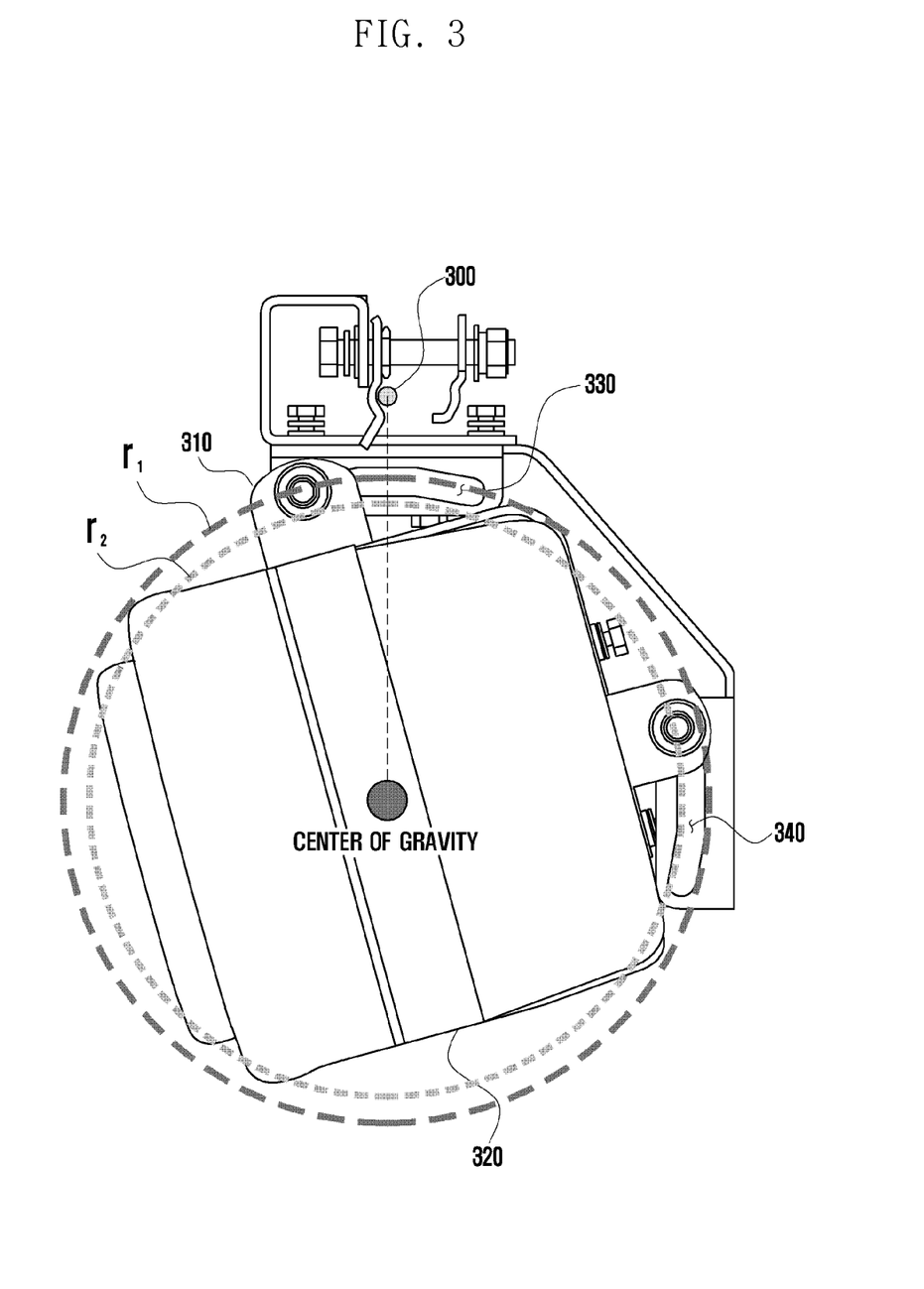
FIG. 3 illustrates a view of the center of gravity of an antenna assembly according to an embodiment of the disclosure.

FIG. 3 illustrates a view of the center of gravity of an antenna assembly according to an embodiment of the disclosure.

According to an embodiment, the antenna assembly may include an enclosure 320, an antenna 350 combined with a first surface of the enclosure 320, and a bracket 310 combined with second and third surfaces of the enclosure 320.

According to an embodiment, each of a first slot 330 and a second slot 340 may have an arc shape. According to an embodiment, extending the arc shape of the first slot 330 may form a circle having a radius of r1, and extending the arc shape of the second slot 340 may form a circle having a radius of r2.

According to an embodiment, the center of a circle having a radius of r1 (i.e., the center of the circle extended from the arc of the first slot) and the center of a circle having a radius of r2 (i.e., the center of the circle extended from the arc of the second slot) may coincide with the center of gravity of the antenna assembly. In this case, even when the antenna assembly is guided along and moved in the first slot 330 and the second slot 340, the antenna assembly may not be tilted in a specific direction.

According to an embodiment, the radius r1 of the circle formed by the extension of the arc of the first slot 330 may be greater than the radius r2 of the circle formed by the extension of the arc of the second slot 340. In this case, a portion of the bracket 310 protruding from the enclosure 320 may be minimized.

According to an embodiment, one end portion of the bracket 310 may be fixed to the wire 300. According to an embodiment, the wire 300 may include a strand wire. According to an embodiment, when a virtual three-dimensional space is formed using, as the origin, the center of gravity of the antenna assembly, the center of the wire 300 may be positioned on the y-axis of the three-dimensional space. In this case, even if the enclosure 320 rotates by a certain angle, the antenna assembly may not be inclined in a specific direction.

Figure 4:
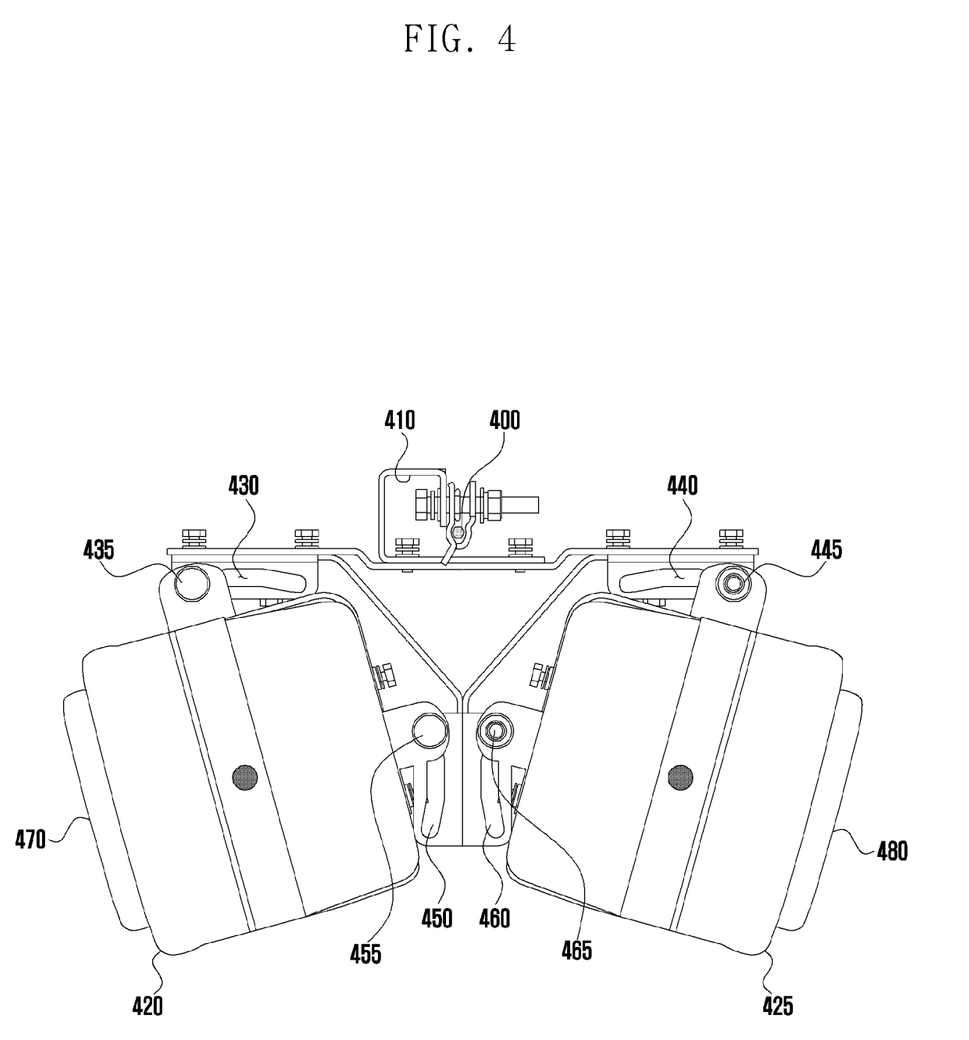
FIG. 4 illustrates a view of two combined antenna assemblies according to an embodiment of the disclosure.

FIG. 4 illustrates a view of two combined antenna assemblies according to an embodiment of the disclosure.

According to an embodiment, a first antenna assembly may include a first enclosure 420 and a first antenna 470, and a second antenna assembly may include a second enclosure 425 and a second antenna 480. According to an embodiment, a bracket 410 may be joined to the first enclosure 420 and the second enclosure 425 through at least one joint part thereof.

According to an embodiment, the first antenna 470 may be combined with a first surface of the first enclosure 420 to be formed integrally with the first enclosure 420. According to an embodiment, the bracket 410 may include a first joint part for being joined to a second surface of the first enclosure 420 and a second joint part for being joined to a third surface of the first enclosure 420.

According to an embodiment, the first joint part may include a first slot 430 and a first protrusion 435 connected with the first slot 430. According to an embodiment, the first protrusion 435 may be joined to the second surface of the first enclosure 420. For example, the first protrusion 435 and the first enclosure 420 may be combined with each other through a bolting method.

According to an embodiment, the first protrusion 435 may include a first bolt and a first nut. According to an embodiment, the first enclosure 420 combined with the first protrusion 435 may be fixedly joined to the bracket 410 by inserting the first bolt into the first slot 430 and then engaging the first nut with the first bolt.

According to an embodiment, the second joint part may include a second slot 450 and a second protrusion 455 connected with the second slot 450. According to an embodiment, the second protrusion 455 may be joined to the third surface of the first enclosure 420. For example, the second protrusion 455 and the first enclosure 420 may be combined with each other through a bolting method.

According to an embodiment, the second protrusion 455 may include a second bolt and a second nut. According to an embodiment, the first enclosure 420 combined with the second protrusion 455 may be fixedly joined to the bracket 410 by inserting the second bolt into the second slot 450 and then engaging the second nut with the second bolt.

According to an embodiment, the second antenna 480 may be combined with a first surface of the second enclosure 425 to be formed integrally with the second enclosure 425. According to an embodiment, the bracket 410 may include a third joint part for being joined to a second surface of the second enclosure 425 and a fourth joint part for being joined to a third surface of the second enclosure 425.

According to an embodiment, the third joint part may include a third slot 440 and a third protrusion 445 connected with the third slot 440. According to an embodiment, the third protrusion 445 may be joined to the second surface of the second enclosure 425. For example, the third protrusion 445 and the second enclosure 425 may be combined with each other through a bolting method.

According to an embodiment, the third protrusion 445 may include a third bolt and a third nut. According to an embodiment, the second enclosure 425 combined with the third protrusion 445 may be fixedly joined to the bracket 410 by inserting the third bolt into the third slot 440 and then engaging the third nut with the third bolt.

According to an embodiment, the fourth joint part may include a fourth slot 460 and a fourth protrusion 465 connected with the fourth slot 460. According to an embodiment, the fourth protrusion 465 may be joined to the third surface of the second enclosure 425. For example, the fourth protrusion 465 and the second enclosure 425 may be combined with each other through a bolting method.

According to an embodiment, the fourth protrusion 465 may include a fourth bolt and a fourth nut. According to an embodiment, the second enclosure 425 combined with the fourth protrusion 465 may be fixedly joined to the bracket 410 by inserting the fourth bolt into the fourth slot 460 and then engaging the fourth nut with the fourth bolt.

According to an embodiment, a bracket for fixing the first enclosure 420 and a bracket for fixing the second enclosure 425 may be formed separately. For example, the bracket shown in FIG. 2A may be used for each of a first bracket for fixing the first enclosure 420 and a second bracket for fixing the second enclosure 425, and the first bracket and the second bracket may be combined with each other. According to an embodiment, an area where the second slot 450 is formed in the first bracket and an area where the fourth slot 460 is formed in the second bracket may be joined to face each other.

According to an embodiment, the first protrusion 435 may be guided along and moved in the first slot 430, and the second protrusion 455 may be guided along and moved in the second slot 450. According to an embodiment, each of the first slot 430 and the second slot 450 may have a curved shape or an arc shape.

According to an embodiment, when the first protrusion 435 is fixed to the center of the first slot 430 and the second protrusion 455 is fixed to the center of the second slot 450, the first antenna 470 disposed on the first surface of the first enclosure 420 may radiate a radio wave in a first direction.

According to an embodiment, when the first protrusion 435 is fixed to one end of the first slot 430 and the second protrusion 455 is fixed to one end of the second slot 450, the first antenna 470 disposed on the first surface of the first enclosure 420 may radiate a radio wave in a second direction.

According to an embodiment, the third protrusion 445 may be guided along and moved in the third slot 440, and the fourth protrusion 465 may be guided along and moved in the fourth slot 460. According to an embodiment, each of the third slot 440 and the fourth slot 460 may have a curved shape or an arc shape.

According to an embodiment, when the third protrusion 445 is fixed to the center of the third slot 440 and the fourth protrusion 465 is fixed to the center of the fourth slot 460, the second antenna 480 disposed on the first surface of the second enclosure 425 may radiate a radio wave in a first direction.

According to an embodiment, when the third protrusion 445 is fixed to one end of the third slot 440 and the fourth protrusion 465 is fixed to one end of the fourth slot 460, the second antenna 480 disposed on the first surface of the second enclosure 425 may radiate a radio wave in a second direction.

According to an embodiment, a relationship between radii of circles formed by extending the arc of each of the first and second slots 430 and 450 may be the same as described in FIG. 3. Similarly, a relationship between radii of circles formed by extending the arc of each of the third and fourth slots 440 and 460 may be the same as described in FIG. 3. In addition, a relationship between the center of gravity of the enclosure and the center of the circle may be the same as described in FIG. 3. Therefore, related descriptions will be omitted herein.

According to embodiments of the disclosure, it is allowed to effectively and safely adjust the antenna direction of the antenna assembly installed on the strand wire. In addition, there is no need to use a separate bracket. Instead, by improving an existing bracket for combining the antenna assembly and the strand wire to adjust the antenna direction, it is possible to reduce the number of components for the antenna direction adjustment.

According to an embodiment, a bracket may include a first member having one end joined to a first surface of an enclosure including an antenna, a second member having one end joined to a second surface of the enclosure, and a third member including a first slot joined to other end of the first member and a second slot joined to other end of the second member. In this bracket, the other end of the first member may be guided along and moved in the first slot, and the other end of the second member may be guided along and moved in the second slot.

According to an embodiment, when the other end of the first member is guided along and moved in the first slot, and the other end of the second member is guided along and moved in the second slot, the enclosure may rotate about a center of gravity of the enclosure.

According to an embodiment, each of the first slot and the second slot may have a shape of an arc having a predetermined central angle.

According to an embodiment, a center of a circle extended from the arc of the first slot and a center of a circle extended from the arc of the second slot may coincide with a center of gravity of the enclosure including the antenna.

According to an embodiment, a radius of a circle extended from the arc of the first slot may be greater than a radius of a circle extended from the arc of the second slot.

According to an embodiment, the first member may include a first bolt and a first nut engaged with the first bolt, and the second member may include a second bolt and a second nut engaged with the second bolt. In addition, the other end of the first member may be fixedly joined to the first slot through the first bolt and the first nut, and the other end of the second member may be fixedly joined to the second slot through the second bolt and the second nut.

According to an embodiment, a bracket may include a first member having one end joined to a first surface of a first enclosure including a first antenna, a second member having one end joined to a second surface of the first enclosure, a third member including a first slot joined to other end of the first member and a second slot joined to other end of the second member, a fourth member having one end joined to a first surface of a second enclosure including a second antenna, a fifth member having one end joined to a second surface of the second enclosure, and a sixth member including a third slot joined to other end of the fourth member and a fourth slot joined to other end of the fifth member. In this bracket, the other end of the first member may be guided along and moved in the first slot, the other end of the second member may be guided along and moved in the second slot, the other end of the fourth member may be guided along and moved in the third slot, and the other end of the fifth member may be guided along and moved in the fourth slot.

According to an embodiment, when the other end of the first member is guided along and moved in the first slot, and the other end of the second member is guided along and moved in the second slot, the first enclosure may rotate about a center of gravity of the first enclosure. In addition, when the other end of the fourth member is guided along and moved in the third slot, and the other end of the fifth member is guided along and moved in the fourth slot, the second enclosure may rotate about a center of gravity of the second enclosure.

According to an embodiment, each of the first slot, the second slot, the third slot, and the fourth slot may have a shape of an arc having a predetermined central angle.

According to an embodiment, a center of a circle extended from the arc of the first slot and a center of a circle extended from the arc of the second slot may coincide with a center of gravity of the first enclosure including the first antenna. In addition, a center of a circle extended from the arc of the third slot and a center of a circle extended from the arc of the fourth slot may coincide with a center of gravity of the second enclosure including the second antenna.

According to an embodiment, an antenna assembly may include an enclosure including an antenna disposed on a first surface thereof, a first member having one end joined to a second surface of the enclosure, a second member having one end joined to a third surface of the enclosure, and a bracket including a first slot joined to other end of the first member and a second slot joined to other end of the second member. In this antenna assembly, the other end of the first member may be guided along and moved in the first slot, and the other end of the second member may be guided along and moved in the second slot.

According to an embodiment, when the other end of the first member is guided along and moved in the first slot, and the other end of the second member is guided along and moved in the second slot, the enclosure may rotate about a center of gravity of the enclosure.

According to an embodiment, each of the first slot and the second slot may have a shape of an arc having a predetermined central angle.

According to an embodiment, a center of a circle extended from the arc of the first slot and a center of a circle extended from the arc of the second slot may coincide with a center of gravity of the enclosure including the antenna.

According to an embodiment, a radius of a circle extended from the arc of the first slot may be greater than a radius of a circle extended from the arc of the second slot.

According to an embodiment, the first member may include a first bolt and a first nut engaged with the first bolt, and the second member may include a second bolt and a second nut engaged with the second bolt. In addition, the other end of the first member may be fixedly joined to the first slot through the first bolt and the first nut, and the other end of the second member may be fixedly joined to the second slot through the second bolt and the second nut.

According to an embodiment, an antenna assembly may include a first enclosure including a first antenna disposed on a first surface thereof, a first member having one end joined to a second surface of the first enclosure, a second member having one end joined to a third surface of the first enclosure, a third member including a first slot joined to other end of the first member and a second slot joined to other end of the second member, a second enclosure including a second antenna disposed on a first surface thereof, a fourth member having one end joined to a second surface of the second enclosure, a fifth member having one end joined to a third surface of the second enclosure, and a sixth member including a third slot joined to other end of the fourth member and a fourth slot joined to other end of the fifth member. In this antenna assembly, the other end of the first member may be guided along and moved in the first slot, the other end of the second member may be guided along and moved in the second slot, the other end of the fourth member may be guided along and moved in the third slot, and the other end of the fifth member may be guided along and moved in the fourth slot.

According to an embodiment, when the other end of the first member is guided along and moved in the first slot, and the other end of the second member is guided along and moved in the second slot, the first enclosure may rotate about a center of gravity of the first enclosure. In addition, when the other end of the fourth member is guided along and moved in the third slot, and the other end of the fifth member is guided along and moved in the fourth slot, the second enclosure may rotate about a center of gravity of the second enclosure.

According to an embodiment, each of the first slot, the second slot, the third slot, and the fourth slot may have a shape of an arc having a predetermined central angle.

According to an embodiment, a center of a circle extended from the arc of the first slot and a center of a circle extended from the arc of the second slot may coincide with a center of gravity of the first enclosure including the first antenna. In addition, a center of a circle extended from the arc of the third slot and a center of a circle extended from the arc of the fourth slot may coincide with a center of gravity of the second enclosure including the second antenna.

While the disclosure has been particularly shown and described with reference to exemplary embodiments thereof, it will be understood by those skilled in the art that various changes in form and details may be made therein without departing from the scope of the subject matter as defined by the appended claims.

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Although the present disclosure has been described with various embodiments, various changes and modifications may be suggested to one skilled in the art. It is intended that the present disclosure encompass such changes and modifications as fall within the scope of the appended claims.

What is claimed is:

1. A bracket comprising:
a first member having one end joined to a first surface of an enclosure including an antenna;
a second member having one end joined to a second surface of the enclosure; and
a third member including a first slot joined to another end of the first member and a second slot joined to another end of the second member,
wherein the another end of the first member is guided along and moved in the first slot, and the another end of the second member is guided along and moved in the second slot,
wherein each of the first slot and the second slot has a shape of an arc having a predetermined central angle,
wherein a center of a circle extended from the arc of the first slot and a center of a circle extended from the arc of the second slot coincide with a center of gravity of the enclosure including the antenna, and
wherein a radius of the circle extended from the arc of the first slot is greater than a radius of the circle extended from the arc of the second slot.

2. The bracket of claim 1, wherein when the another end of the first member is guided along and moved in the first slot, and the another end of the second member is guided along and moved in the second slot, the enclosure rotates about a center of gravity of the enclosure.

3. The bracket of claim 1, wherein the first member includes a first bolt and a first nut engaged with the first bolt,
wherein the second member includes a second bolt and a second nut engaged with the second bolt,
wherein the another end of the first member is fixedly joined to the first slot through the first bolt and the first nut, and
wherein the another end of the second member is fixedly joined to the second slot through the second bolt and the second nut.

4. A bracket comprising:
a first member having one end joined to a first surface of a first enclosure including a first antenna;
a second member having one end joined to a second surface of the first enclosure;
a third member including a first slot joined to another end of the first member and a second slot joined to another end of the second member;
a fourth member having one end joined to a first surface of a second enclosure including a second antenna;
a fifth member having one end joined to a second surface of the second enclosure; and
a sixth member including a third slot joined to another end of the fourth member and a fourth slot joined to another end of the fifth member,
wherein the another end of the first member is guided along and moved in the first slot, the another end of the second member is guided along and moved in the second slot, the another end of the fourth member is guided along and moved in the third slot, and the another end of the fifth member is guided along and moved in the fourth slot,
wherein each of the first slot and the second slot has a shape of an arc having a predetermined central angle,
wherein a center of a circle extended from the arc of the first slot and a center of a circle extended from the arc of the second slot coincide with a center of gravity of the first enclosure including the first antenna, and
wherein a radius of the circle extended from the arc of the first slot is greater than a radius of the circle extended from the arc of the second slot.

5. The bracket of claim 4, wherein when the another end of the first member is guided along and moved in the first slot, and the another end of the second member is guided along and moved in the second slot, the first enclosure rotates about a center of gravity of the first enclosure, and
wherein when the another end of the fourth member is guided along and moved in the third slot, and the another end of the fifth member is guided along and moved in the fourth slot, the second enclosure rotates about a center of gravity of the second enclosure.

6. The bracket of claim 4, wherein each of the third slot and the fourth slot has a shape of an arc having a predetermined central angle.

7. The bracket of claim 6,
wherein a center of a circle extended from the arc of the third slot and a center of a circle extended from the arc of the fourth slot coincide with a center of gravity of the second enclosure including the second antenna.

8. An antenna assembly comprising:
an enclosure including an antenna disposed on a first surface thereof;

a first member having one end joined to a second surface of the enclosure;

a second member having one end joined to a third surface of the enclosure; and a bracket including a first slot joined to another end of the first member and a second slot joined to another end of the second member, wherein the another end of the first member is guided along and moved in the first slot, and the another end of the second member is guided along and moved in the second slot, wherein each of the first slot and the second slot has a shape of an arc having a predetermined central angle, wherein a center of a circle extended from the arc of the first slot and a center of a circle extended from the arc of the second slot coincide with a center of gravity of the enclosure including the antenna, and wherein a radius of the circle extended from the arc of the first slot is greater than a radius of the circle extended from the arc of the second slot.

9. The antenna assembly of claim 8, wherein when the another end of the first member is guided along and moved in the first slot, and the another end of the second member is guided along and moved in the second slot, the enclosure rotates about a center of gravity of the enclosure.

10. The antenna assembly of claim 8, wherein the first member includes a first bolt and a first nut engaged with the first bolt, wherein the second member includes a second bolt and a second nut engaged with the second bolt, wherein the another end of the first member is fixedly joined to the first slot through the first bolt and the first nut, and wherein the another end of the second member is fixedly joined to the second slot through the second bolt and the second nut.

11. An antenna assembly comprising:

a first enclosure including a first antenna disposed on a first surface thereof;

a first member having one end joined to a second surface of the first enclosure;

a second member having one end joined to a third surface of the first enclosure;

a third member including a first slot joined to another end of the first member and a second slot joined to another end of the second member;

a second enclosure including a second antenna disposed on a first surface thereof;

a fourth member having one end joined to a second surface of the second enclosure;

a fifth member having one end joined to a third surface of the second enclosure; and a sixth member including a third slot joined to another end of the fourth member and a fourth slot joined to another end of the fifth member, wherein the another end of the first member is guided along and moved in the first slot, the another end of the second member is guided along and moved in the second slot, the another end of the fourth member is guided along and moved in the third slot, and the another end of the fifth member is guided along and moved in the fourth slot, wherein each of the first slot and the second slot has a shape of an arc having a predetermined central angle, wherein a center of a circle extended from the arc of the first slot and a center of a circle extended from the arc of the second slot coincide with a center of gravity of the first enclosure including the first antenna, and wherein a radius of the circle extended from the arc of the first slot is greater than a radius of the circle extended from the arc of the second slot.

12. The antenna assembly of claim 11, wherein when the another end of the first member is guided along and moved in the first slot, and the another end of the second member is guided along and moved in the second slot, the first enclosure rotates about a center of gravity of the first enclosure, and wherein when the another end of the fourth member is guided along and moved in the third slot, and the another end of the fifth member is guided along and moved in the fourth slot, the second enclosure rotates about a center of gravity of the second enclosure.

13. The antenna assembly of claim 11, wherein each of the third slot and the fourth slot has a shape of an arc having a predetermined central angle.

14. The antenna assembly of claim 13, wherein a center of a circle extended from the arc of the third slot and a center of a circle extended from the arc of the fourth slot coincide with a center of gravity of the second enclosure including the second antenna.

\* \* \* \* \*